(12) United States Patent
Leisenheimer et al.

(10) Patent No.: US 6,637,219 B2
(45) Date of Patent: Oct. 28, 2003

(54) COOLING DEVICE WITH A CONTROLLED COOLANT PHASE UPSTREAM OF THE COMPRESSOR

(75) Inventors: Bert Leisenheimer, Karlsruhe (DE); Holger Ullrich, Rastatt (DE)

(73) Assignee: Eaton Fluid Power GmbH (DE)

(*) Notice: Subject to any disclaimer, the term of this patent is extended or adjusted under 35 U.S.C. 154(b) by 0 days.

(21) Appl. No.: 10/015,733

(22) Filed: Dec. 13, 2001

(65) Prior Publication Data

US 2002/0078698 A1 Jun. 27, 2002

(30) Foreign Application Priority Data

Dec. 16, 2000 (DE) .......................... 100 62 948

(51) Int. Cl.[7] .................. F25B 41/00; F25B 49/00
(52) U.S. Cl. ............................. 62/132; 62/513
(58) Field of Search ................. 62/132, 180, 189, 62/200, 201, 203, 205, 212, 217, 225, 434

(56) References Cited

U.S. PATENT DOCUMENTS

| | | | | |
|---|---|---|---|---|
| 3,698,204 A | * | 10/1972 | Shlotterbeck et al. | 62/206 |
| 3,788,090 A | * | 1/1974 | Richards | 62/139 |
| 4,475,686 A | * | 10/1984 | Huelle et al. | 238/68 |
| 4,485,635 A | * | 12/1984 | Sakano | 62/209 |
| 4,962,648 A | * | 10/1990 | Takizawa et al. | 62/199 |
| 5,551,249 A | * | 9/1996 | Van Steenburgh, Jr. | 62/196.4 |

FOREIGN PATENT DOCUMENTS

| | | | |
|---|---|---|---|
| DE | 42 30 818 A 1 | 9/1992 | |
| DE | 195 22 884 A 1 | 6/1995 | |
| DE | 198 32 480 A 1 | 7/1998 | |
| DE | 199 25 744 A 1 | 6/1999 | |
| JP | 57-31740 | * 2/1982 | 62/201 |
| JP | 2-192566 | * 7/1990 | 62/201 |

OTHER PUBLICATIONS

Derwent English abstracts of DE 198 32 480 A 1, DE 199 25 744 A 1, DE 195 22 884 A 1, and DE 42 30 818 A 1.
Patent Abstracts of Japan of 08306737, 06308127, and 11155176.

* cited by examiner

*Primary Examiner*—Melvin Jones
(74) *Attorney, Agent, or Firm*—Rader, Fishman & Grauer PLLC

(57) ABSTRACT

A fluid collector of a cooling device, which collects fluid carried along by the coolant in a reservoir, is arranged upstream of the compressor. The return of the fluid coolant, which can also contain oil, into the section leading to the compressor takes place via an inlet conduit. A control device regulates the reintroduction of the fluid via a regulating valve in such a way, that the vapor conveyed to the compressor does not contain any large fluid particles.

16 Claims, 2 Drawing Sheets

Fig.1

COOLING DEVICE WITH A CONTROLLED COOLANT PHASE UPSTREAM OF THE COMPRESSOR

Figure 2:
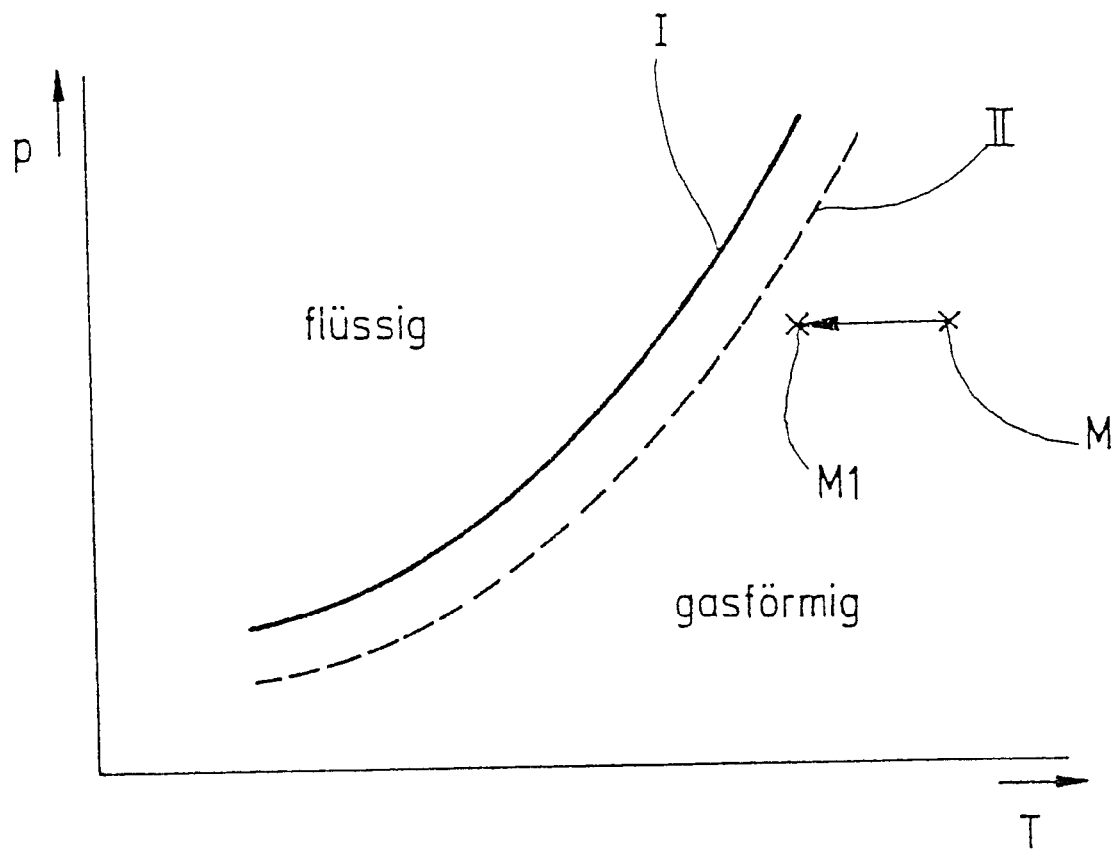

The invention relates to a cooling device, in particular for use in motor vehicles.

Modern motor vehicles are often equipped with airconditioners containing a cooling device. The cooling device is used for cooling air, which is supplied to the passenger compartment, or is recirculated therein. In connection with this, the demand for cooling output is subject to great fluctuations. If the vehicle has been heated by the rays of the sun over an extended period of time and is subsequently put into operation, a large cooling output is demanded from the cooling device. With low ambient temperatures, however, the cooling device need only operate at low output. Therefore the cooling device requires a large control range, wherein it is required that it operate stably with any output requirement within the control range.

As a rule, cooling devices have a compressor driven by the vehicle engine. Thus, the number of revolutions of the compressor is inevitably the result of the number of revolutions of the engine. The cooling device must operate stably, independently of the respectively actual number of revolutions of the compressor.

Lately, alternative coolants have been tested, for example $CO_2$ (carbon dioxide), hydrocarbons or others. The employment of such coolants often requires an uncommonly high operating pressure in the cooling devices, for example more than 20 bar. Depending on the layout, operating pressures between 70 and 150 bar can occur. The respective compressors are designed for the required operating pressure and are also equipped to build up the required pressure difference. However, they react very sensitively to impermissible operating conditions. Such a compressor is designed to aspirate coolant in the form of a vapor and to also pass it on in the form of a vapor to the condenser. If the aspirated vapor contains drops of fluid, these can damage the compressor. For example, the inlet valve can be damaged. This must be prevented in all operational states of the compressor, i.e. at a high, as well as at a low number of revolutions, and at high cooling output, as well as low cooling output.

The object on which the invention is based, to produce an operationally dependable cooling device, is derived from this.

This object is attained by a cooling device in accordance with the characteristics of claim 1. Moreover, by means of the method in accordance with claim 14 a method is disclosed, which can be used to generate cold air in an operationally dependable manner.

The cooling device in accordance with the invention has a coolant circuit containing a section leading to the compressor, in which the coolant is essentially present in the form of a vapor. The collector provided there removes fluid which has possibly been carried along by the coolant vapor. This can be droplets of fluid coolant as well as oil droplets. Coolant droplets can be contained in the line coming from the condenser if incompletely vaporized coolant is carried along with the vapor coming from the condenser, or if coolant recondenses in the line leading away from the condenser. Moreover, oil droplets can be contained therein. Besides the coolant, the coolant circuit can contain a defined amount of oil circulating with the coolant for lubricating the compressor.

The condenser provides wet coolant vapor, which can carry droplets of fluid along. These are precipitated by the collector to a large.extent, i.e. in a quite predominant amount, and are collected in a reservoir. The coolant is therefore conducted from the collector to the compressor in the form of a vapor, which is relieved to a large extent of the fluid phase. As a rule it is possible to provide a heat exchanger (a so-called interior heat exchanger) between the collector and the compressor, which slightly warms the coolant conducted to the compressor. In this way the coolant vapor arriving at the compressor is dry in every case and contains no fluid particles.

An inlet conduit, which is regulated by a control device, is provided in the cooling device in accordance with the invention between the reservoir of the collector and the section leading to the compressor. Fluid coolant is added in a controlled and tolerable manner to the vaporous coolant via the inlet conduit, but only so much that the added fluid coolant will become completely vaporized in the remaining section from the inlet location to the compressor, or at least does not form large drops. The coolant is preferably introduced into the section upstream of the above mentioned interior heat exchanger, so that it has a chance to become vaporized in the interior heat exchanger. A control device is provided for controlling this process, which monitors the state of the coolant (in particular the phase state) via a sensor device.

The cooling device in accordance with the invention conducts the condensate, which was precipitated in the collector and collected in the reservoir and as a rule contains oil, back into the section leading to the compressor. In this way it is assured that the connected compressor receives the required amount of oil as continuously and steadily as possible, and that on the other hand no fluid particles can cause its destruction. The reservoir in the collector acts as a buffer, which receives excess coolant and oil if the arriving coolant vapor contains too much of the fluid phase. In this case the reservoir in the collector is slowly filled with fluid coolant and with oil, while only the required and admissible amounts are returned into the section via the inlet conduit. It is assured in this way that the compressor does not run dry. However, if the coolant vapor coming from the condenser does not contain a fluid phase and the vapor is already dry, for example in the case where the condenser must cool very warm air, no fluid phase is precipitated in the collector. But it is nevertheless possible to introduce fluid coolant and oil from the reservoir into the section, for one, in order to empty the reservoir again, and also to supply oil to the compressor. The cooling device in accordance with the invention can make do with a smaller amount of stored oil than is customary, if this is desired. The return flow of fluid from the collector into the section not only prevents the entry of fluid into the compressor, but furthermore provides the prerequisites for stabilizing the operating point of the cooling device. This in particular in view of the vapor quality (pressure p, temperature T) of the vapor aspirated by the compressor.

It is therefore possible to operate the cooling device in accordance with the invention over a very large operating range without the appearance of excess wear or damage, in particular to the compressor.

An apparatus for slightly heating the coolant coming from the condenser is preferably provided between the collector and the compressor. This apparatus can be, for example, an interior heat exchanger, in which the coolant aspirated by the compressor exchanges heat with the coolant released by the condenser, which is at least at ambient temperature, before it is conducted to the expansion valve. In this way the expansion valve receives pre-cooled coolant on the one hand, and on the other the compressor as a whole operates at a higher temperature level, which in turn increases the efficiency of the cooling device as a whole.

Moreover, the employment of an interior heat exchanger is also advantageous in that appreciable amounts of coolant and oil can be provided to the coolant vapor coming from the collector upstream of the heat exchanger, which undergo an intimate mixing with the vaporous coolant in the heat exchanger, as well as warming, so that the mixture as a whole arrives in vapor form at the inlet of the compressor. However, in principle it would also be possible to introduce the fluid coolant into the section downstream of the heat exchanger, provided the section leading to the compressor is sufficient for the re-vaporization of the fluid coolant.

The control device is connected with a sensor device which is used to detect whether the entire coolant supplied to the compressor is present in the gaseous phase (i.e. as a vapor). In the simplest case the sensor device contains a pressure sensor and a temperature sensor, both of which are arranged at the inlet of the compressor or the outlet of the interior heat exchanger (or between them). If a material which in the fluid phase conducts electricity, but does so to a lesser degree or not at all in vapor form, is used as the coolant, a conductivity sensor can be used as the sensor device. The control device contains a table or a computing module. The phase interface line in the pressure-temperature diagram which describes the pressure and temperature values in which the fluid phase borders the gaseous phase, can be stored as a formula or a table. The computing module can compare the actually measured temperature and pressure values with the temperature and pressure values of the phase interface line and determine in this way whether a sufficient safety margin from the fluid phase has been maintained.

Various control strategies can be based on this. For example, it is possible to introduce the fluid (coolant with oil) kept in the reservoir as continuously as possible in order to keep the fill level in the reservoir as low as possible. In such a case the control device regulates the introduction of fluid coolant into the section possibly in such a way that the required safety margin of the phase state at the compressor inlet from the phase interface line is just maintained. If, however, it is desired to always introduce fluid from the reservoir into the section if possible, so that the compressor is operated as little as possible or never with only a small amount of oil or without any amount of oil in the aspirated coolant, the control device regulates the control member in such a way that a minimal flow of fluid coolant is always introduced into the section, wherein this minimal flow is reduced to even lower values only in those cases where the state of the coolant vapor does not permit this, i.e. if otherwise too close an approach to the phase interface line would occur. If necessary, this control strategy can be supplemented in such a way that the introduction of fluid coolant into the section is increased in those cases where it is permissible and the fill level in the reservoir is too high. Permissibility can be determined on the basis of the measured pressure and temperature values of the coolant vapor at the compressor inlet. A further control strategy can lie in always keeping the distance of the operating point from the phase interface line constant, or in keeping the operating point itself always constant. The latter also includes keeping the pressure constant, which is made possible, if required, by the additional control of the expansion valve.

Monitoring the fill level is possible if a fill level sensor, which monitors the fill level in the reservoir of the collector, is a part of the sensor device in addition to the temperature sensor and the pressure sensor. Because of this it becomes possible in addition to make the volume of the reservoir so small that only a fraction of the coolant contained in the coolant cycle as a whole can be received in fluid form by the reservoir. By means of this it is possible to create a collector which is small and space-saving. Moreover, with appropriately small dimensions it can be designed with only little difficulties for very large burst pressures, which is of particular importance in connection with alternative coolants, such as $CO_2$.

Details of advantageous embodiments of the invention are the subject of the dependent claims and can be taken from the description or the drawings.

An exemplary embodiment of the invention is represented in the drawings. Shown are in:

Figure 1:
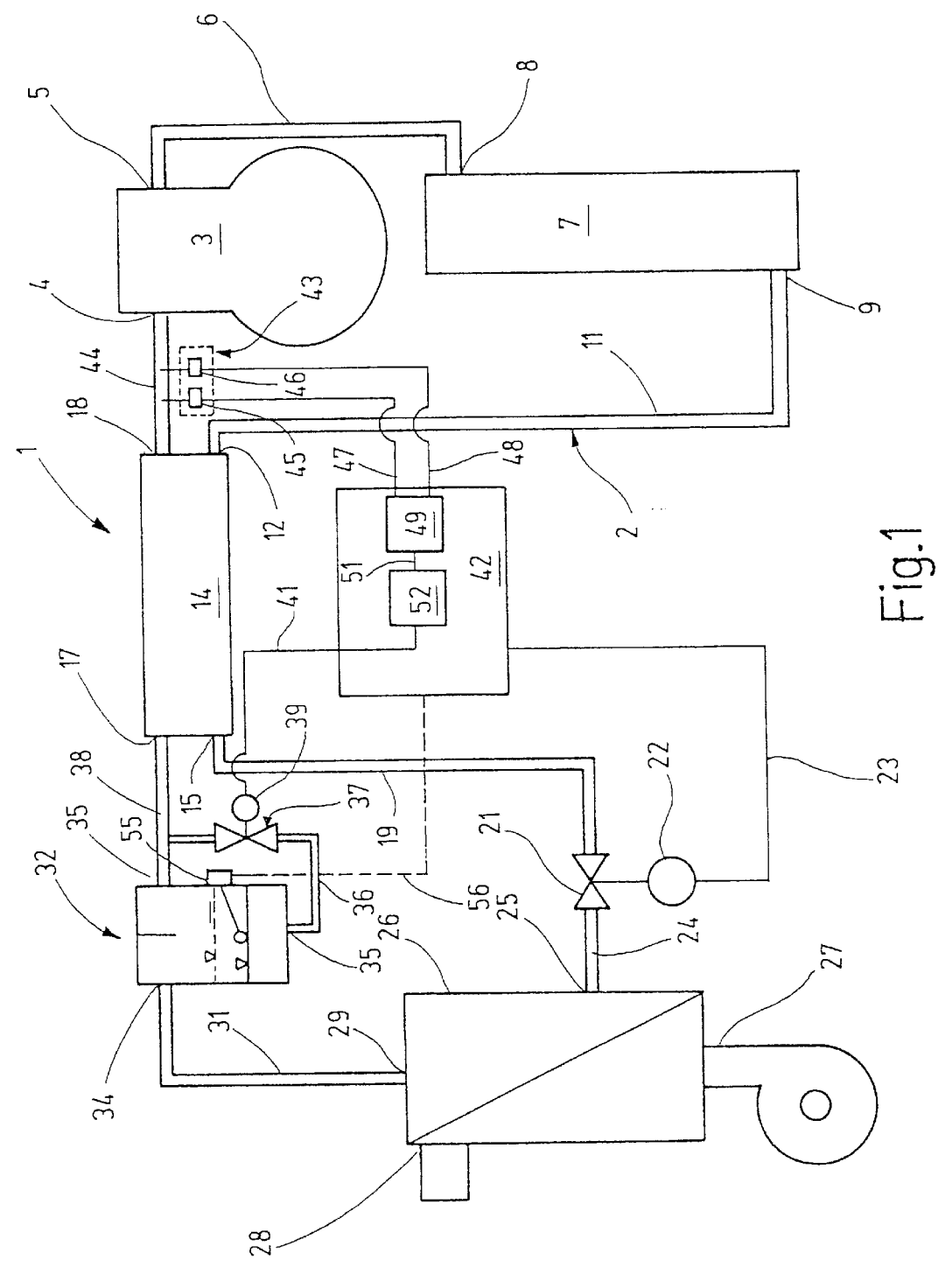

FIG. 1, a cooling device in accordance with the invention in a schematic representation, and FIG. 2, a phase diagram of a coolant in a schematic representation.

The essential elements of a cooling device 1 of a motor vehicle are schematically represented at a high abstract level in FIG. 1. The cooling device 1 has a cooling circuit 2, which extends over several components. Part of these are a compressor 3 which is designed as a reciprocating compressor, for example, and which is driven by the engine, not further represented, of the motor vehicle.

The compressor 3 has an inlet 4, where it aspirates vaporous coolant, and an outlet 5, where it gives off compressed coolant. A line 6 conducts compressed coolant from the outlet 5 to a condenser 7. The latter receives compressed coolant, which was adiabatically warmed during compression, for example $CO_2$, propane, butane, R134a or ammonia, at its input 8. The condenser is air-cooled, for example. It has an outlet 9, where coolant issues, whose temperature is lower than at the outlet 5 of the compressor and which is fluid.

A line 11 leads from the outlet 9 to an inlet 12 of an interior heat exchanger 14. A conduit extends from the inlet 12 through the interior heat exchanger 14 to its outlet 15. The interior heat exchanger 14 has a further conduit, which leads from an inlet 17 to an outlet 18 and wherein heat is exchanged with the first mentioned conduit between the inlet 12 and the outlet 15.

While the outlet 18 of the heat exchanger 14 is connected with the inlet 4 of the compressor 3, the outlet 15 of the heat exchanger 14 leads via a line 19 to an expansion valve 21. The latter is provided with a preferably electrical actuator 22 which is used to release the expansion valve 21 to a greater or lesser degree in accordance with a control signal received through a signal line 23, and in this way to permit more or less coolant to pass through it. The expansion valve 21 is a relief valve and is controlled in such a way that it throttles coolant passing through it and therefore creates a pressure drop.

A line 24 starting at the expansion valve 21 leads to an inlet 25 of a condenser 26. The latter represents a heat exchanger in which the coolant heat is exchanged with air to be cooled. For this purpose the condenser 26 has an air inlet 27 and a cold air outlet 28.

A line 31, starting at an outlet 29, leads out of the interior of the condenser 26, which is hermetically sealed and contains coolant, to a fluid collector 32. The latter has an interior chamber 33 which is used as a reservoir for fluid coolant, possibly also containing precipitated oil or another lubricant as well. The fluid collector 32 has an inlet 34 and an outlet 35, both of which are arranged above a fluid level forming in the reservoir. A further connector in the form of an outlet 35 leads away from the bottom, or at least from a location below the fluid level of the fluid collector 32. A line 36, constituting an inlet conduit, is connected to this outlet 35 and leads to a control valve 37. From there, this line 36 further leads to a connecting line 38, which connects the outlet 30 of the fluid collector 32 with the inlet 17 of the heat exchanger 14.

The control valve 37 has an electrical actuating device 39, for example a motor actuating device, which is triggered via a signal or control line 41. The actuating device 39 can be an actuating motor, a step motor or the like, for example, and affects the throttling or opening of the control valve 37 in accordance with the actuating pulses received.

The actuating device 22, as well as the actuating device 39, are connected to a control device 42 via lines 23, or 41, which regulates the operation of at least the actuating device 39 and, as a rule, the operation of the actuating device 22 as well. The control device 42 is furthermore connected with a sensor device 43 arranged on a connecting line 34. The latter leads from the outlet 18 of the heat exchanger 14 to the inlet 4 of the compressor 3.

The sensor device 43 contains at least one temperature sensor 45 and one pressure sensor 46, which measure the actual temperature and the actual pressure in the connecting line 44. Via appropriate signal lines 47, 48, the temperature sensor 45 and the pressure sensor 46 issue electrical signals, which report the temperature and the pressure of the cooling fluid upstream of the inlet 4 of the compressor 3 to appropriate inputs of the control device 42.

The electrical control device 42 contains a control module 49, which can be designed as computing module and which determines the phase state of the coolant in the connecting line 44 from the measured temperature and the measured pressure, and issues an appropriate signal at its outlet 51. The signal is passed on to a comparator module 52, which compares the actual phase state with a phase interface line in accordance with FIG. 2. If the distance of the actual phase state from the phase interface line is sufficiently great, the comparator module 52 issues an opening signal to the actuating device 39. However, if the distance is less than a predetermined minimum distance, the comparator module 52 issues a closing signal to the actuating device 39. Thus, the comparator module 52 can be designed as a regulating device, which keeps the distance of the operating point from the phase interface line constant.

The cooling device 1 so far described operates as follows:

During its operation, the cooling device represented in FIG. 1 continuously recirculates the coolant contained in the closed coolant circuit. The coolant is under great static pressure. The compressor 3 builds up an increased coolant pressure at its pressure side, i.e. at its outlet 5. In the course of this it simultaneously conveys coolant via the outlet 5 and the line 6 to the condenser 7. With the expansion valve 21 still closed, the latter also is under increased pressure. In the course of the compressing process the coolant is adiabatically warmed in the compressor 3 and in the process reaches temperatures clearly above the ambient temperature, for example 80° C. In the condenser 7 it is again cooled down below this temperature, for example to 30° C., so that it condenses because of the effect of the increased pressure. The coolant in the fluid state reaches the inlet 12 of the interior heat exchanger 14 via the line 11, where in a counterflow it exchanges heat with vaporous coolant coming from the condenser 26. The latter coolant is cold, so that the fluid coolant is further cooled in the heat exchanger 14 and exits at the outlet 15, possibly at a temperature dropped below the ambient temperature.

Thus, the coolant reaches the expansion valve, which reduces the pressure of the fluid and cooled coolant. Then the coolant reaches the condenser 26 in the expanded state via the line 24. Here, the coolant absorbs ambient heat, but in particular heat from the air flowing through the heat exchanger and condenser 26, which is to be cooled, and it boils.

The created cold vapor is a wet vapor and, via the line 31, it reaches the fluid collector 32. In the reservoir 33 of the latter, fluid portions of the coolant which were taken along are precipitated because of the considerably reduced flow speed, and form a fluid level. The coolant flowing through the fluid collector 32 is in contact with the fluid level and therefore is a wet vapor. It is at the dew point. This coolant now reaches the inlet 17 of the heat exchanger 14 via the connecting line 38, where it is heated above the dew point by the warm fluid coolant arriving in a counterflow, and is therefore issued as dry vapor at the outlet 18.

The control device 42 detects the state of the vapor in the connecting line 42 by means of the signals provided by the sensor device 43. The control module 49 calculates the distance of the actual state point from the dew point line on the basis of the measured temperature and the measured pressure. This is illustrated in FIG. 2. The actual temperature and the actual pressure are identified as the measured value M. If the distance from the dew point line I illustrated in FIG. 2 is sufficiently large, the comparator module 52 opens the control valve 37 and lets the fluid coolant contained in the reservoir 33 flow through the line 36 into the line 38. In this case the inflow is limited to relatively small values. The limit has been fixed in such a way that an excessive fluid flow does not result in fluid advancing as far as the inlet 4.

The fluid coolant, or the mixture of coolant and lubricant, flowing in via the control valve 37, together with the wet vapor conducted in the line 38, reaches the heat exchanger 14, which heats the mixture to such an extent that dry saturated coolant vapor is created at the outlet 18. The latter has a lower temperature than the dry saturated coolant vapor originally present at the outlet 18. Therefore the sensor device 43 detects a changed temperature value. The control module 49 determines the measured value M1 as illustrated in FIG. 2. This measured value is still sufficiently far removed from the dew point line I. The permissible threshold which is not to be exceeded and is enforced by the comparator module 52 is represented in dashed line as curve II in FIG. 2.

With an expanded embodiment as represented in dashed lines in FIG. 1, a fill level sensor 55 is arranged on the fluid collector 32 and is connected with the control device 42 via a signal line 56. With this embodiment it is possible to implement further control strategies. For example, in addition to the phase state in the line 44, the control device can determine the amount of the opening of the control valve 37 in accordance with the height of the fill level in the fluid collector 32. It is perhaps possible with higher fill levels to permit a closer approach to the safety line II than at low fill levels.

Independently of which control strategy is made the basis, it is achieved in each case that coolant reaching the inlet 4 of the condenser 3 is free of fluid drops. Therefore the coolant can flow to the compressor 3 at very great velocities without the danger arising that fluid particles carried along damage, for example, the inlet valve of the compressor, or other machine elements. It is therefore possible to operate with very narrow flow cross sections in the section constituted by the connecting line 38, the heat exchanger 14, and the connecting line 44. Narrow flow cross sections in turn allow the establishment of a high degree of pressure resistance of the required lines at relatively low wall thicknesses. Therefore the described solution is particularly suited for high-pressure cooling devices.

A fluid collector 32 of a cooling device, which collects fluid carried along by the coolant in a reservoir 33, is arranged upstream of the compressor 3. The return of the fluid coolant, which can also contain oil, into the section leading to the compressor 3 takes place via an inlet conduit 36. A control device 42 regulates the reintroduction of the fluid via a regulating valve 37 in such a way, that the vapor conveyed to the compressor 3 does not contain any large fluid particles.

What is claimed is:

1. A cooling device, in particular for motor vehicles, comprising:
   a coolant circuit having at least one section in which a coolant is present in the form of a vapor;
   a precipitation collector arranged in said at least one section having a reservoir for keeping back a coolant present in the form of a fluid from within said coolant present in the form of vapor;
   an inlet conduit leading from said reservoir into said at least one section for providing said coolant present in the form of fluid to said coolant present in the form of vapor;
   a control member arranged in said inlet conduit for regulating the flow of said coolant present in the form of fluid introduced into said at least one section;
   a sensor device for detecting the state of said coolant present in the form of fluid in said at least one section;
   a control device connected to said sensor device and said control member; and wherein a heat exchanger is arranged in said at least one section, by means for which heat is supplied to said coolant present in the form of vapor.

2. The cooling device in accordance with claim 1, characterized in that the inlet conduit terminates into the section upstream of the heat exchanger in respect to the flow-through direction of the section.

3. The cooling device in accordance with claim 1, characterized in that the sensor device is arranged downstream of the heat exchanger in respect to the flow-through direction of the section.

4. The cooling device in accordance with claim 1, wherein said cooling device has an expansion valve which is controlled by said control device.

5. A cooling device, in particular for motor vehicles, comprising:
   a coolant circuit having at least one section in which a coolant is present in the form of a vapor;
   a precipitation collector arranged in said at least one section having a reservoir for keeping back a coolant present in the form of a fluid from within said coolant present in the form of vapor;
   an inlet conduit leading from said reservoir into said at least one section for providing said coolant present in the form of fluid to said coolant present in the form of vapor;
   a control member arranged in said inlet conduit for regulating the flow of said coolant present in the form of fluid introduced into said at least one section;
   a sensor device for detecting the state of said coolant present in the form of fluid in said at least one section;
   a control device connected to said sensor device and said control member; and wherein a pressure sensor is a part of said sensor device, said pressure sensor is used for detecting the actual pressure of said coolant present in the form of vapor.

6. The cooling device in accordance with claim 5, wherein a temperature sensor for detecting said coolant present in the form of vapor is a part of said sensor device.

7. A cooling device, in particular for motor vehicles, comprising:
   a coolant circuit having at least one section in which a coolant is present in the form of a vapor;
   a precipitation collector arranged in said at least one section having a reservoir for keeping back a coolant present in the form of a fluid within said coolant present in the form of vapor;
   an inlet conduit leading from said reservoir into said at least one section for providing said coolant present in the form of fluid to said coolant present in the form of vapor;
   a control member arranged in said inlet conduit for regulating the flow of said coolant present in the form of fluid introduced into said at least one section;
   a sensor device for detecting the state of said coolant present in the form of fluid in said at least one section;
   a control device connected to said sensor device and said control member; and wherein said control device controls said control member in such a way that said coolant present in the form of vapor is present in the form of a dry vapor at said sensor device.

8. The cooling device in accordance with claim 7, characterized in that the control device controls the control member in such a way that the flow of the fluid coolant introduced via the inlet conduit into the section is less than a coolant flow which can be maximally fed back.

9. The cooling device in accordance with claim 8, characterized in that the fed-back coolant flow is less by a predetermined amount than the coolant flow which can be maximally fed back.

10. A cooling device, in particular for motor vehicles, comprising:
    a coolant circuit having at least one section in which a coolant is present in the form of a vapor;
    a precipitation collector arranged in said at least one section having a reservoir for keeping back a coolant present in the form of a fluid from within said coolant present in the form of vapor;
    an inlet conduit leading from said reservoir into said at least one section for providing said coolant present in the form of fluid to said coolant present in the form of vapor;
    a control member arranged in said inlet conduit for regulating the flow of said coolant present in the form of fluid introduced into said at least one section;
    a sensor device for detecting the state of said coolant present in the form of fluid in said at least one section;
    a control device connected to said sensor device and said control member; and wherein said control device controls said control member in such a way that said coolant present in the form of vapor is present in the form of a dry vapor after passing through said at least one section.

11. The cooling device in accordance with claims 10, characterized in that the control device controls the control member in such a way that the flow of the fluid coolant introduced via the inlet conduit into the section is less than a coolant flow which can be maximally fed back.

12. A cooling device, in particular for motor vehicles, comprising:
    a coolant circuit having at least one section in which a coolant is present in the form of a vapor;

a precipitation collector arranged in said at least one section having a reservoir for keeping back a coolant present in the form of a fluid from within said coolant present in the form of vapor;

an inlet conduit leading from said reservoir into said at least one section for providing said coolant present in the form of fluid to said coolant present in the form of vapor;

a control member arranged in said inlet conduit for regulating the flow of said coolant present in the form of fluid introduced into said at least one section;

a sensor device for detecting the state of said coolant present in the form of fluid in said at least one section;

a control device connected to said sensor device and said control member; and wherein a fill level sensor is part of said sensor device, which detects a fill level in said reservoir and which is connected to said control device.

13. The cooling device in accordance with claim 12, characterized in that the control device monitors the fill level in the reservoir and throttles the expansion valve when a predetermined maximum fill level has been exceeded.

14. A method for operating a cooling device having a compressor which is to be provided with coolant vapor, comprising the following steps:

fluid coolant contained in the coolant vapor is precipitated at a location upstream of the compressor by means of a precipitating collector, the phase state of the coolant is continuously monitored at a location upstream of the compressor, and fluid coolant is metered into the coolant vapor upstream of the compressor in such an amount that the coolant vapor upstream of the compressor is dry.

15. The method in accordance with claim 14, characterized in that the coolant vapor is warmed following the precipitation of the fluid phase and prior to the renewed admixture of fluid coolant.

16. The method in accordance with claim 14, characterized in that the precipitated fluid coolant is intermediately buffered.

* * * * *